US012713180B2

(12) United States Patent
Wang et al.

(10) Patent No.: US 12,713,180 B2
(45) Date of Patent: Aug. 18, 2026

(54) EARPHONES WITH SOUND BLOCKING MEMBER

(71) Applicant: SHENZHEN SHOKZ CO., LTD., Shenzhen (CN)

(72) Inventors: Zhen Wang, Shenzhen (CN); Juan Wang, Shenzhen (CN); Lei Zhang, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 127 days.

(21) Appl. No.: 18/764,208

(22) Filed: Jul. 4, 2024

(65) Prior Publication Data

US 2024/0365054 A1 Oct. 31, 2024

Related U.S. Application Data

(63) Continuation of application No. PCT/CN2022/122310, filed on Sep. 28, 2022.

(51) Int. Cl.

| | |
|---|---|
| ***H04R 1/34*** | (2006.01) |
| ***H04R 1/10*** | (2026.01) |
| ***H04R 1/28*** | (2006.01) |

(52) U.S. Cl.

CPC ........... *H04R 1/345* (2013.01); *H04R 1/1008* (2013.01); *H04R 1/1041* (2013.01);

(Continued)

(58) Field of Classification Search

CPC .... H04R 1/345; H04R 1/1008; H04R 1/1041; H04R 1/1075; H04R 1/288; H04R 2460/13

(Continued)

(56) References Cited

U.S. PATENT DOCUMENTS

| | | | | |
|---|---|---|---|---|
| 10,506,320 | B1 | 12/2019 | Lott | |
| 2008/0152163 | A1 | 6/2008 | Mulvey | |
| 2023/0276163 | A1* | 8/2023 | Bibl | G06F 3/044 381/74 |

FOREIGN PATENT DOCUMENTS

| | | | |
|---|---|---|---|
| CN | 102780939 | A | 11/2012 |
| CN | 204887362 | U | 12/2015 |

(Continued)

OTHER PUBLICATIONS

International Search Report in PCT/CN2022/122310 mailed on Jun. 13, 2023, 7 pages.

(Continued)

*Primary Examiner* — Vivian C Chin
*Assistant Examiner* — Douglas J Suthers
(74) *Attorney, Agent, or Firm* — METIS IP LLC

(57) ABSTRACT

The present disclosure discloses an earphone. The earphone includes a loudspeaker component and at least one blocking member, the at least one blocking member including a first blocking member, the first blocking member being provided on one side of the loudspeaker component, wherein, in a wearing state, at least a portion of the first blocking member extends in an extension direction from the loudspeaker component to an ear canal of a user. In the above manner, the earphone provided in the present disclosure can increase a volume heard by the user's ear, so that the user can hear the content with a smaller volume and also the sound leakage can be reduced, thereby improving the user's listening effect.

20 Claims, 7 Drawing Sheets

(52) U.S. Cl.
CPC .......... *H04R 1/1075* (2013.01); *H04R 1/288* (2013.01); *H04R 2460/13* (2013.01)

(58) Field of Classification Search
USPC .......................................................... 381/57
See application file for complete search history.

(56) References Cited

FOREIGN PATENT DOCUMENTS

| | | | |
|---|---|---|---|
| CN | 207720376 | U | 8/2018 |
| CN | 210469711 | U | 5/2020 |
| CN | 111314820 | A | 6/2020 |
| CN | 211352403 | U | 8/2020 |

OTHER PUBLICATIONS

Written Opinion in PCT/CN2022/122310 mailed on Feb. 22, 2024, 5 pages.

* cited by examiner

With a blocking member Without a blocking member

EARPHONES WITH SOUND BLOCKING MEMBER

CROSS-REFERENCE TO RELATED APPLICATION

This application is a Continuation of International Application No. PCT/CN2022/122310, filed on Sep. 28, 2022, the contents of which are incorporated herein by reference.

TECHNICAL FIELD

The present disclosure relates to the technical field of sound-producing devices, and in particular, to earphones.

BACKGROUND

As a common electronic device, the earphone has been frequently used in daily life, and as an electro-acoustic conversion device, the earphone is used to convert input audio electrical signals into mechanical vibrations, which produce a variety of sounds.

There are two types of earphones, i.e., air-conduction earphones and bone-conduction earphones. The air-conduction earphones conduct vibrations to the eardrum through the air, and the bone-conduction earphones conduct the vibrations to the eardrum through the bones. However, no matter which type of conduction manner is used, there is a problem of sound leakage.

Moreover, since external noise enters the ear canal, the users need to use a higher headphone volume when listening, which increases the volume of the sound leakage.

SUMMARY

The present disclosure provides an earphone to solve the problem of poor listening effect and large sound leakage of the earphone. To solve the above technical problems, one technical solution in the present disclosure is: an earphone is provided, the earphone comprising: a loudspeaker component and at least one blocking member, the at least one blocking member including a first blocking member coupled to the loudspeaker component; wherein in a wearing state, at least a portion of the first blocking member extends in an extension direction from the loudspeaker component to an ear canal of a user.

In some embodiments, a first dimension of the first blocking member in a first direction is less than or equal to twice a second dimension of the loudspeaker component in the first direction, the first direction being the extension direction from the loudspeaker component to the ear canal, and the first dimension is a dimension of a portion of the first blocking member exposing from the loudspeaker component.

In some embodiments, in the wearing state, at least a portion of a projection of the first blocking member is in a concha cavity of the user, and a projection direction of the projection of the first blocking member is the same as a vibration direction of the loudspeaker component.

In some embodiments, in the wearing state, at least a portion of the projection of the first blocking member covers the concha cavity of the user.

In some embodiments, the loudspeaker component includes a sound-out surface, a first side surface, a second side surface, and a third side surface, the first, second, and third side surfaces are adjacent to the sound-out surface, the first side surface is adjacent to the second side surface and the third side surface, and the second side surface faces the third side surface; the sound-out surface faces the head of the user in the wearing state, and the first blocking member is provided on the first side surface; the at least one blocking member further includes a second blocking member, the second blocking member being provided on the second side surface and/or the third side surface. The second blocking member is provided on the other side of the loudspeaker component and is adjacent to the first blocking member.

In some embodiments, a third dimension of the second blocking member in a second direction is less than or equal to the first dimension, the second direction being perpendicular to the first direction.

In some embodiments, the loudspeaker component includes a housing and a speaker, the housing is configured to accommodate the speaker, and the first blocking member is fixed to the housing or connected to the housing through a movable connection, or the first blocking member is provided on the speaker.

In some embodiments, the earphone includes a driving member, a sensor, and a controller, wherein the driving member is connected to the first blocking member, the driving member and the sensor are electrically connected to the controller, the sensor is configured to detect ambient noise, and the controller is configured to adjust an extension length of the first blocking member relative to the housing based on a magnitude of the ambient noise.

In some embodiments, the driving member is configured to drive the first blocking member to retract, rotate, or fold.

In some embodiments, the first blocking member is slidably provided on the housing, the driving member includes a screw and a nut, and the first blocking member is connected to the nut; or the driving member includes a relay, an elastic member, and a ferromagnetic member, the first blocking member being connected to the ferromagnetic member, and the elastic member being provided between the relay and the ferromagnetic member.

In some embodiments, one end of the first blocking member is connected to the housing through a hinge connection, and the driving member includes a motor and a telescopic rod, one end of the telescopic rod being connected to the motor through a drive connection, and the other end of the telescopic rod being connected to the first blocking member through a hinge connection, and the motor is configured to drive the first blocking member to rotate by driving the telescopic rod to telescope.

In some embodiments, the driving member includes a telescoping component, the first blocking member is provided on one side of the telescoping component and folds or unfolds as the telescoping component telescopes.

In some embodiments, the earphone further includes a waterproof ring, wherein the waterproof ring is provided on the housing, and the first blocking member or the telescopic rod slidably cooperates with the waterproof ring.

In some embodiments, the earphone further includes an outer housing, wherein the outer housing accommodates the loudspeaker component, and the first blocking assembly is provided on the outer housing or the housing;

and a flexible member is provided between the housing and the outer housing.

In some embodiments, the flexible member is provided between the housing and the speaker.

In some embodiments, the flexible member accommodates the housing; or the flexible member includes a plurality of flexible blocks, the plurality of flexible blocks being spaced between the housing and the outer housing.

In some embodiments, the first blocking member is provided on the housing and partially extends out of the housing, and a flexible ring is provided at a junction between the first blocking member and the outer housing.

In some embodiments, a material of the at least one blocking member has a loose porous structure or a loose plush structure.

In some embodiments, the loose porous structure has a porosity of 10% to 80%.

The earphone disclosed in the present discourse brings beneficial effects compared with the prior art. The earphone includes a loudspeaker component and at least one blocking member, the at least one blocking member includes a first blocking member. By providing the first blocking member on one side of the loudspeaker component, wherein when the user wears the earphone, at least a portion of the first blocking member extends in an extension direction from the loudspeaker component to an ear canal of the user, and the at least one blocking member may vibrate with a body of the earphone, causing the surrounding air to vibrate and transmit sound to the eardrum, which is equivalent to increasing the air conduction and increasing a volume of sound heard by the ear. Moreover, more sound waves generated by the loudspeaker component may be reflected to the ear canal by the at least one blocking member, thereby increasing the sound that the user hears from the earphone. The at least one blocking member also blocks external noise from being transmitted to the ear canal, which allows the user to hear the content clearly at a smaller volume. Using a smaller volume may further reduce the sound leakage, thereby improving the user's listening experience.

BRIEF DESCRIPTION OF THE DRAWINGS

To more clearly illustrate the technical solutions in the embodiments of the present disclosure or the prior art, the accompanying drawings that need to be used in the descriptions of the embodiments or prior art will be briefly introduced in the following. It is obvious that the accompanying drawings in the following description are only some of the embodiments of the present disclosure, and other drawings may be obtained based on these drawings without creative labor to those skilled in the art, wherein.

DETAILED DESCRIPTION

The technical solutions in the embodiments of the present disclosure will be clearly and completely described below in conjunction with the accompanying drawings in the embodiments of the present disclosure, and it is clear that the described embodiments are only a part of the embodiments of the present disclosure, and not all of the embodiments. Based on the embodiments in the present disclosure, other embodiments obtained by those skilled in the art without making creative labor fall within the scope of protection of the present disclosure.

The terms "first," "second," and "third" in this embodiment are used for descriptive purposes only and are not to be construed as indicating or implying relative importance or implicitly specifying the number of technical features indicated. Thus, the limitation of "first," "second," and "third" may expressly or implicitly include at least one such feature. In the description of the present disclosure, "a plurality" means at least two, e.g., two, three, etc., unless otherwise explicitly and specifically limited. Additionally, the terms "comprising" and "having," and any variations thereof, are intended to cover a non-exclusive inclusion. For example, a process, method, system, product, or apparatus comprising a series of steps or units is not limited to the listed steps or units, but optionally also includes steps or units that are not listed, or optionally also includes other steps or units inherent to those processes, methods, products, or devices.

References to "embodiments" herein imply that particular features, structures, or characteristics described in conjunction with embodiments may be included in at least one embodiment of the present disclosure. The presence of this phrase at various locations in the present disclosure does not necessarily always refer to the same embodiment, nor is it a separate or alternative embodiment that is mutually exclusive of other embodiments. It is understood by those skilled in the art, both explicitly and implicitly, that the embodiments described herein may be combined with other embodiments.

Figure 1:
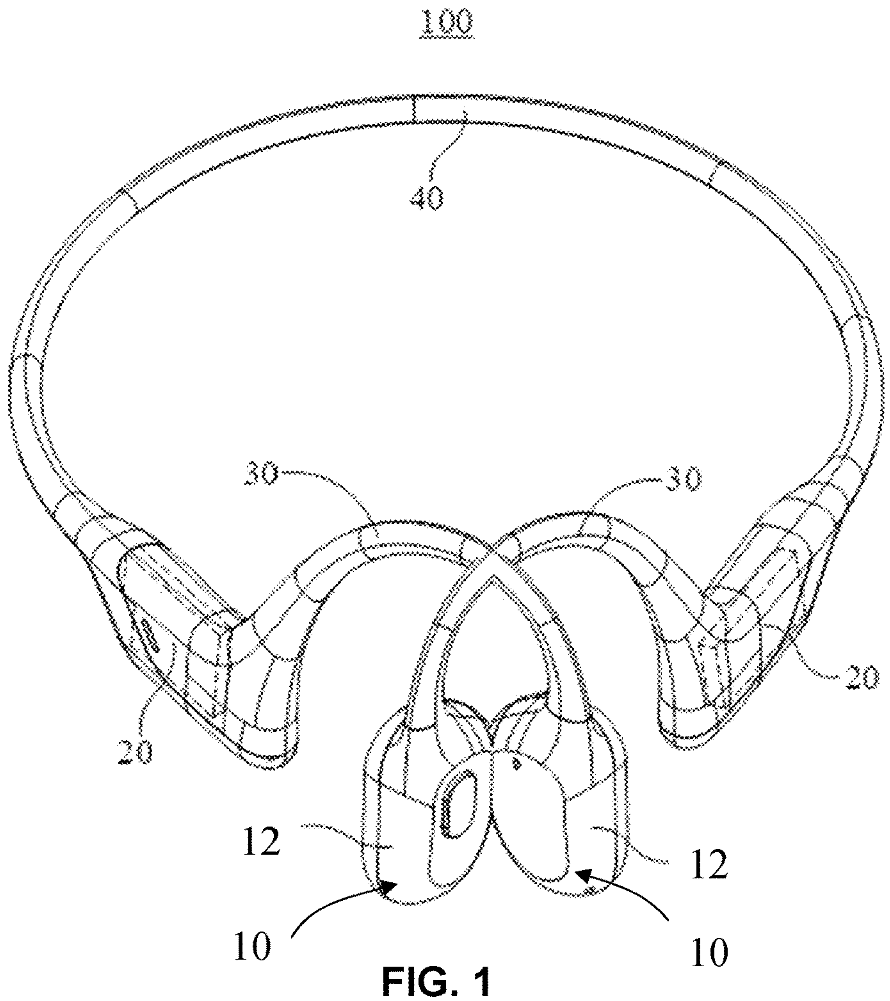
FIG. 1 is a schematic diagram illustrating an exemplary structure of an earphone according to some embodiments of the present disclosure.
Figure 2:
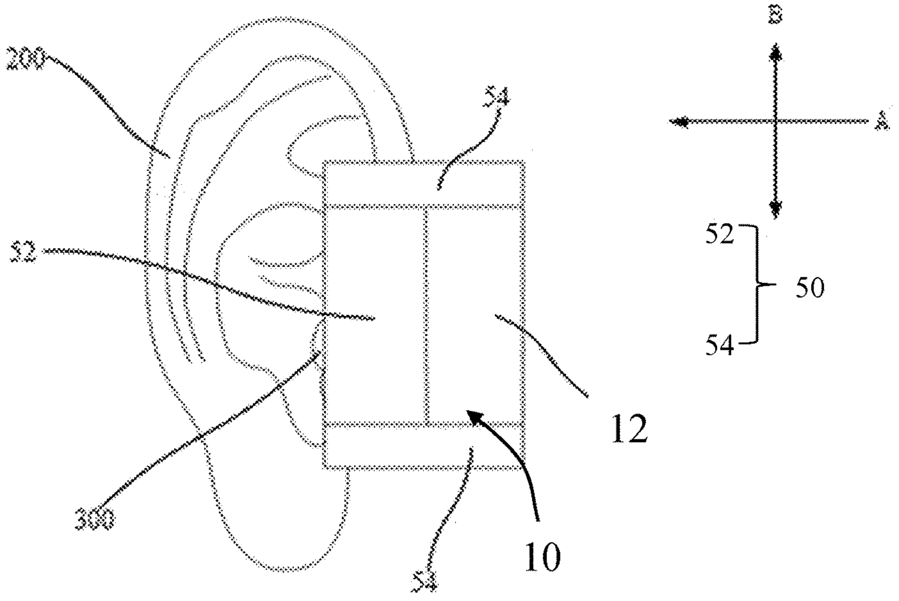
FIG. 2 is a schematic diagram illustrating a front view of the earphone illustrated in FIG. 1 in a wearing state and an ear.

The present disclosure provides an earphone 100, referring in combination to FIG. 1 to FIG. 2. FIG. 1 is a schematic diagram illustrating an exemplary structure of the earphone according to some embodiments of the present disclosure, and FIG. 2 is a schematic diagram illustrating a front view of the earphone illustrated in FIG. 1 in a wearing state and an ear.

In the present disclosure, the earphone 100 is a rear-hook earphone. The earphone 100 includes a loudspeaker component 10, a function component 20, an ear-hook 30, and a rear-hook 40. The loudspeaker component 10 is configured to fit against the head of a user to transmit sound. The function component 20 is electrically connected to the loudspeaker component 10. The ear-hook 30 is rigidly connected between the loudspeaker component 10 and the function component 20. There may be two loudspeaker components 10, two function components 20, and two ear-hooks 30, and the two loudspeaker components 10, the two function components 20, and the two ear-hooks 30 are worn on the left and right sides of the head, respectively. It will be appreciated that in other embodiments of the present disclosure, the earphone 100 may include various types such as headphones or ear-hook earphones without the rear-hook 40 or the ear-hook 30. The function component 20 may be integrated with the loudspeaker component 10, i.e., the function component 20 and the loudspeaker component 10 are non-independent structures and may be integrated into one component.

In the present embodiment, the loudspeaker component 10 is a sound-producing component of the earphone 100, which may convert an input audio electrical signal into mechanical vibrations, and conduct the mechanical vibrations to the eardrum of a user via bones of the head of the user such that the user may hear a sound generated by the earphone 100. In other words, the manner of sound transmission of the loudspeaker component 10 in this implementation is bone-conduction. It will be appreciated that in other embodiments of the present disclosure, the manner of sound transmission of the loudspeaker component 10 may also include air conduction or a combination of bone conduction and air conduction.

The function component 20 may include a battery housing, a circuit board, and/or a battery. The battery housing is configured to accommodate the circuit board and/or the battery, one end of the ear-hook 30 is connected to the battery housing, and the other end of the ear-hook 30 is connected to the loudspeaker component 10.

When the earphone 100 is in a wearing state, the ear-hook 30 hangs above an auricle 200 of the user. The rear hook 40 is connected between two function components 20 or between two ear hooks 30. In some embodiments of the present disclosure, the ear-hook 30 may have an inverted "U" shape. In some other embodiments, the ear-hook 30 may have other shapes, which are not specifically limited herein.

As shown in FIG. 1, the earphone 100 provided in the present disclosure has the loudspeaker component 10 independent from the function component 20, and the loudspeaker component 10 is located on a front side of the auricle 200.

In other embodiments, the loudspeaker component 10 may be disposed on the auricle or disposed on a rear side of the auricle, and in contact with the auricle 200 or with the head of the user. The present disclosure does not specifically limit a wearing position of the loudspeaker component 10 when the earphone 100 is in the wearing state.

As shown in FIG. 2, the earphone 100 includes at least one blocking member 50. The at least one blocking member 50 is provided on the loudspeaker component 10. The at least one blocking member 50 includes a first blocking member 52, and the first blocking member 52 is connected to the loudspeaker component 10. In the wearing state, the first blocking member 52 extends in an extension direction from the loudspeaker component 10 to an ear canal 300 of the user. In the present embodiment, the extension direction from the loudspeaker component 10 to the ear canal 300 is a positive direction of an A-axis, i.e., in the present embodiment, the first blocking member 52 is a structure formed by extending from the loudspeaker component 10 along the positive direction of the A-axis.

The loudspeaker component 10 includes a housing 12 and a speaker. The speaker is a sound-producing body of the loudspeaker component, and the housing 12 is configured to accommodate the speaker.

Figure 3:
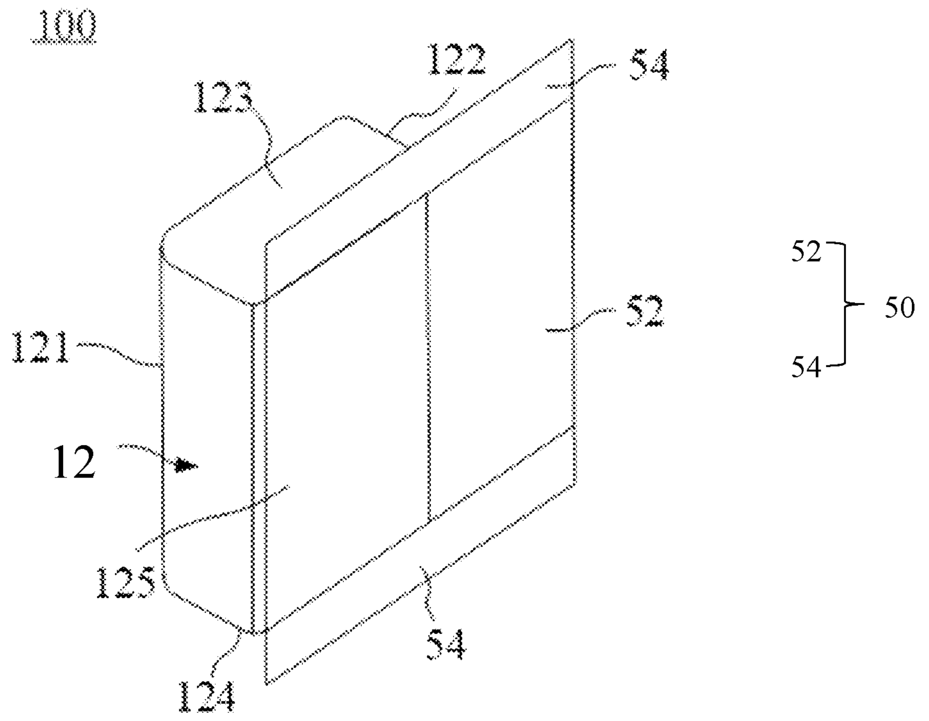
FIG. 3 is a schematic diagram illustrating an exemplary structure of a loudspeaker component and at least one blocking member of the earphone illustrated in FIG. 2.

According to FIG. 3, FIG. 3 is a schematic diagram illustrating an exemplary structure of the loudspeaker component and the blocking member of the earphone illustrated in FIG. 2.

Specifically, the housing 12 is provided with a sound-out surface 121, a first side surface 122, a second side surface 123, and a third side surface 124. The first side surface 122, the second side surface 123, and the third side surface 124 are adjacent to the sound-out surface 121. The at least one blocking member 50 may be connected to the first side surface 122, the second side surface 123, and the third side surface 124. In some implementations, the first blocking member 52 is connected to the first side surface 122.

In some embodiments, the first blocking member 52 may be connected to the sound-out surface 121 or a top surface 125 of the loudspeaker component 10. The sound-out surface 121 faces the head and is a side of the loudspeaker component 10 that is close to the user, and the top surface 125 is a side of the loudspeaker component 10 that is away from the user. When the first blocking member 52 is connected to the sound-out surface 121, a vibration of the first blocking member 52 may be consistent with the loudspeaker component 10, thereby increasing the volume and improving the sound quality.

The at least one blocking member 50 is connected to the loudspeaker component 10 and extends along the extension direction from the loudspeaker component 10 to the ear canal 300, and sound waves generated by the vibration of the loudspeaker component 10 may be reflected to the ear canal 300 by the at least one blocking member 50, thereby increasing the sound that the user hears from the earphone 100. Moreover, when the loudspeaker component 10 vibrates, the at least one blocking member 50 may be driven to vibrate, and the vibration of the at least one blocking member 50 may drive a vibration of surrounding air to generate an air-conduction sound transmitted to the ear canal 300 of the user, thereby enhancing a volume of the sound heard by the user. In the earphone 100 of the present disclosure, in addition to the sound generated by the vibration of the loudspeaker component 10, the at least one blocking member 50 may also produce the air-conduction sound, thereby enabling the user to hear a greater volume of sound than a simple bone-conduction vibration earphone. In such cases, a vibration intensity required by the loudspeaker component 10 of the earphone 100 of the present disclosure may be lower than that of the bone-conduction vibration earphone for obtaining a desired volume, thereby reducing a sound leakage generated by the loudspeaker component 10. Furthermore, in some embodiments of the present disclosure, the at least one blocking member 50 may also block a portion of the ear canal 300 to isolate external noise, so as to reduce the influence of the external noise on the listening effect, thereby increasing the volume of the sound generated by the earphone 100 and heard by the user, and reducing the sound leakage generated by the earphone 100.

In some embodiments of the present application, the at least one blocking member 50 may be of the same material as the housing 12 of the loudspeaker component 10, and may be integrated with the housing 12 of the loudspeaker component 10 by integral molding. It will be appreciated that the at least one blocking member 50 may also be of other materials, and may be fixedly connected to the loudspeaker component 10 by various fixing connections such as snap-fit, welding, screw connection, or the like.

In some embodiments, the material of the at least one blocking member 50 may include a wind-noise-proof material. The wind-noise-proof material is mainly a loose porous structure, such as foam or porous silica gel, etc., and generally has a porosity of 10% to 80%. The loose porous structure may reduce air velocity near a surface of the wind-noise-proof material, thus reducing a wind noise and avoiding excessive wind noise affecting the user's listening. The wind-noise-proof material may also include a loose plush structure, and such structure may also reduce the air velocity near the surface of the wind-noise-proof material, thereby reducing the wind noise.

In this embodiment, in the wearing state, the first side surface 122 faces the ear canal 300, the first blocking member 52 is connected to the first side surface 122, and the first blocking member 52 has the shape of a square flat plate. The flat plate allows the first blocking member 52 to achieve the blocking effect while also ensuring the lightweight of the loudspeaker component 10, thereby preventing the loudspeaker component 10 from being too large and causing weight increase and discomfort to the user. Optionally, the first blocking member 52 may have the shape of an arc-shaped plate or a curved plate.

In other embodiments, a cross-section of the loudspeaker component 10 along a direction of the sound vibration may have other shapes such as circular, elliptical, or runway, which is not specifically limited herein.

Specifically, the first blocking member 52 extends in the extension direction from the loudspeaker component 10 to the ear canal 300, and when the first blocking member 52 vibrates as the loudspeaker component 10 vibrates, the first blocking member 52 drives the surrounding air to vibrate to generate the air-conduction sound, and the air-conduction sound may be conducted into a concha cavity of the user, thereby enabling the user to hear a greater volume of sound. In such cases, the loudspeaker component 10 of the earphone 100 of the present disclosure may require a lower vibration intensity to obtain the desired volume, which may reduce the sound leakage generated by the loudspeaker component 10. Furthermore, the first blocking member 52 extending in the extension direction from the loudspeaker component 10 to the ear canal 300 may block a portion of the ear canal 300 to isolate the external noise, so as to reduce the influence of the external noise on the listening effect, thereby increasing the volume of sound from the earphone 100, and reducing the sound leakage generated by the earphone 100.

In this embodiment, the thickness of the first blocking member 52 may be uniform, i.e., the thickness of the first blocking member 52 is the same at all positions.

Figure 4:
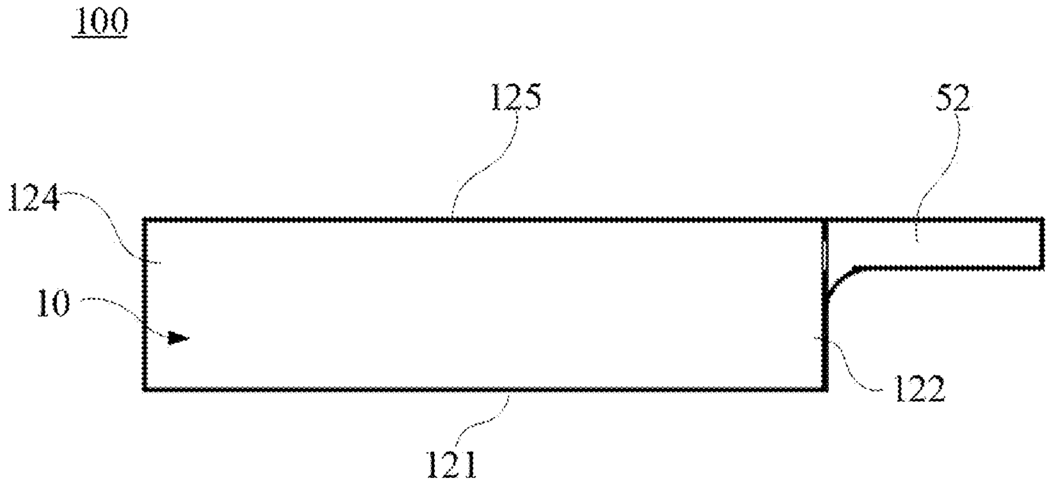
FIG. 4 is a schematic diagram illustrating a bottom view of an earphone according to some embodiments of the present disclosure.

According to FIG. 4, FIG. 4 is a schematic diagram illustrating an exemplary bottom view of an earphone according to one embodiment of the present disclosure.

It will be appreciated that in some other embodiments of the present disclosure, the thickness of the first blocking member 52 may vary at different positions. For example, in some embodiments of the present disclosure, the thickness of the first blocking member 52 is gradually reduced in a direction from the loudspeaker component 10 to a direction away from the loudspeaker component 10, and the first blocking member 52 is connected to the housing 12 through a smooth connection, so as to avoid stress concentration at a connection position between the first blocking member 52 and the housing 12.

Figure 5:
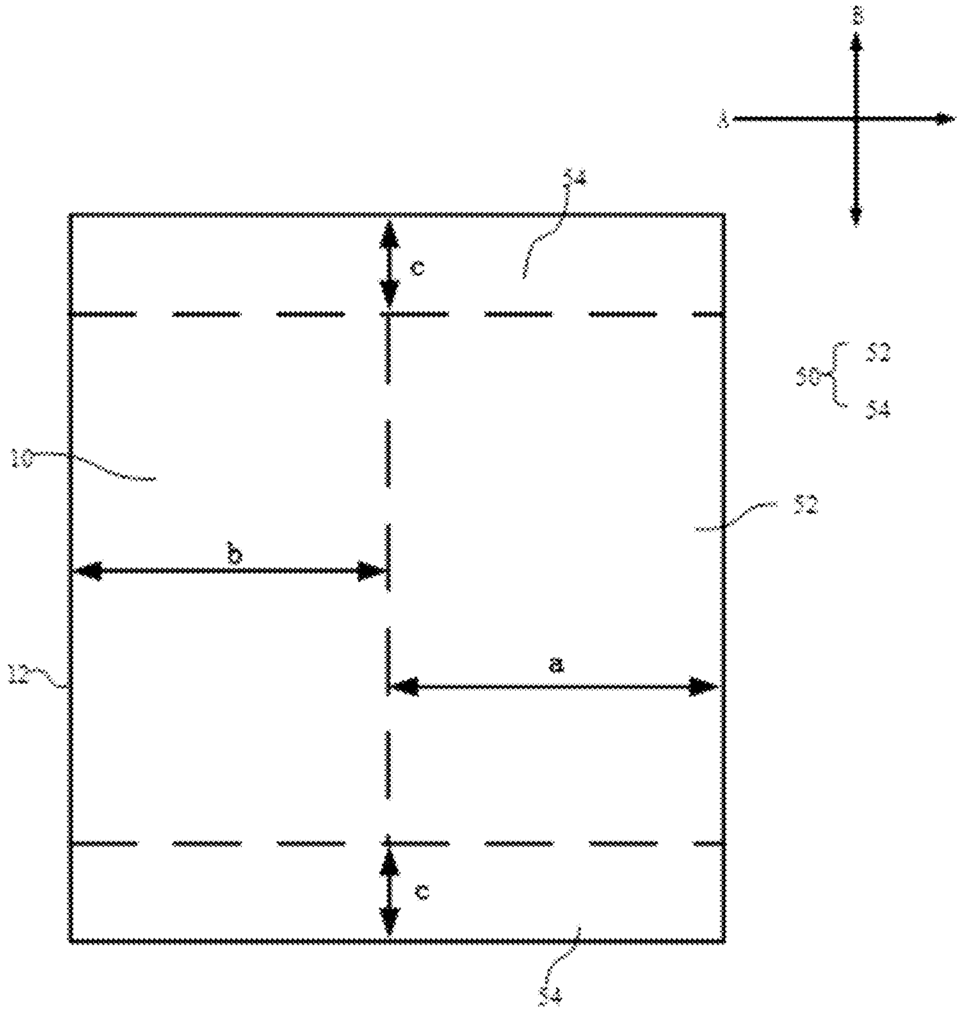
FIG. 5 is a schematic diagram illustrating a planar structure of the loudspeaker component and the at least one blocking member of the earphone illustrated in FIG. 3.

According to FIG. 5, FIG. 5 is a schematic diagram illustrating an exemplary planar structure of the loudspeaker component and the at least one blocking member of the earphone illustrated in FIG. 2.

In some embodiments of the present disclosure, a first dimension a of the first blocking member 52 in a first direction A is less than or equal to twice a second dimension b of the loudspeaker component 10 in the first direction A. The first direction A is an extension direction from the loudspeaker component 10 to the ear canal 300, and the first dimension a is a distance between an end of the first blocking member 52 away from the loudspeaker component 10 and a first side surface. For example, the first dimension a is equal to 0.5 times the second dimension b; the first dimension a is equal to the second dimension b; the first dimension a is equal to 1.5 times the second dimension b; or the first dimension a is equal to 2 times the second dimension b, which is not limited herein.

When the first dimension a is less than or equal to twice the second dimension b and is not zero, more sound waves generated by the vibration of the loudspeaker component 10 may be reflected to the ear canal 300 by the at least one blocking member 50, which increases a volume of sound generated by the earphone 100 and heard by a user, and such arrangement can ensure that the first blocking member 52 does not extend too long to abut against the user's ear, and a weight of the first blocking member 52 may be reasonably controlled to avoid the first blocking member 52 from being too long or too heavy to cause discomfort to the user. The first blocking member 52 may vibrate as the loudspeaker component 10 vibrates, and drive surrounding air to vibrate to generate an air-conduction sound transmitted to the user's ear canal 300, so that the user can hear a greater volume compared to a simple bone-conduction vibration earphone, thereby reducing a sound leakage of the earphone 100.

In some embodiments, when the user wears the earphone 100, at least a portion of a projection of the first blocking member 52 is in a concha cavity of the user such that more air-conduction sound generated by the vibration of the at least one blocking member 50 may enter the ear canal 300 and heard by the ear, and more sound waves generated by the loudspeaker component 10 may be reflected into the ear canal 300 by the at least one blocking member 50, thereby increasing the volume of the sound generated by the earphone 100 and heard by the user. Furthermore, in a wearing state, the first blocking member 52 covers the concha cavity of the user, and compared to the above embodiments, such a configuration ensures that the first blocking member 52 covers more area of the concha cavity, so that the air-conduction sound generated by the vibration of the at least one blocking member 50 enters the ear canal 300 to the greatest extent, thereby increasing the volume of the sound generated by the earphone 100 and heard by the user.

In some embodiments, the at least one blocking member 50 further includes a second blocking member 54. The second blocking member 54 is connected to the second side surface 123 and/or the third side surface 124. A third dimension c of the second blocking member 54 in a second direction B is less than or equal to the first dimension a. The second direction B is perpendicular to the first direction A.

In this embodiment, the second blocking member 54 includes two flat plates respectively provided on the second side surface 123 and the third side surface 124, and the first blocking member 52 and the second blocking member 54 are together spliced to form the square flat plate for blocking the ear canal 300, which can increase a blocking area of the at least one blocking member 50 on the ear canal 300. In the present disclosure, the first blocking member 52 or the second blocking member 54 may be a flat plate of various shapes, such as a square, a circular arc, etc., or the first blocking member 52 or the second blocking member 54 may be an arc-shaped plate or a curved plate. The present disclosure does not impose specific limitations on the shape, etc., of the first blocking member 52 and the second blocking member 54. The first blocking member 52 and the second blocking member 54 may be independent structures, or the first blocking member 52 and the second blocking member 54 may be an integrally molded structure.

In some embodiments, the thickness of the second blocking member 54 at different positions may be varied. For example, the thickness of the second blocking member 54 may gradually decrease from a direction close to the loudspeaker component 10 to a direction away from the loudspeaker component 10, and the second blocking member 54 is connected to the housing 12 of the loudspeaker component 10 through a smooth connection, thereby avoiding stress concentration at a connection position between the second blocking member 54 and the housing 12 of the loudspeaker component 10.

Figure 6:
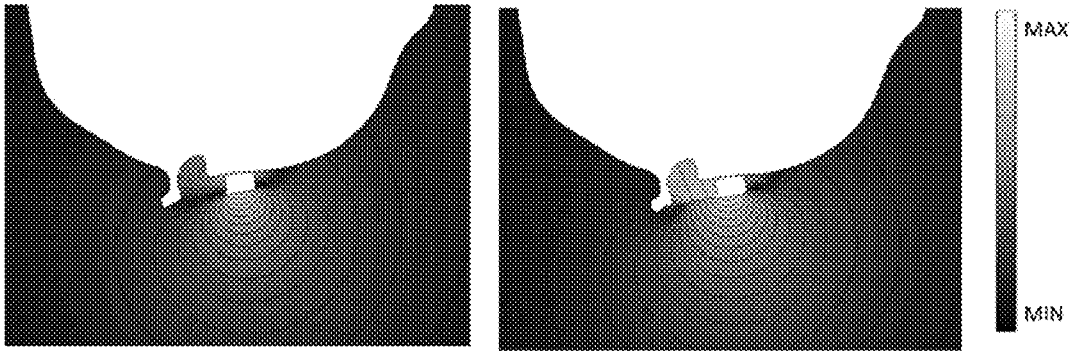
FIG. 6 is a schematic diagram illustrating a comparison of sound pressures in an ear canal when the earphone illustrated in FIG. 2 is with and without a blocking member.
Figure 7:
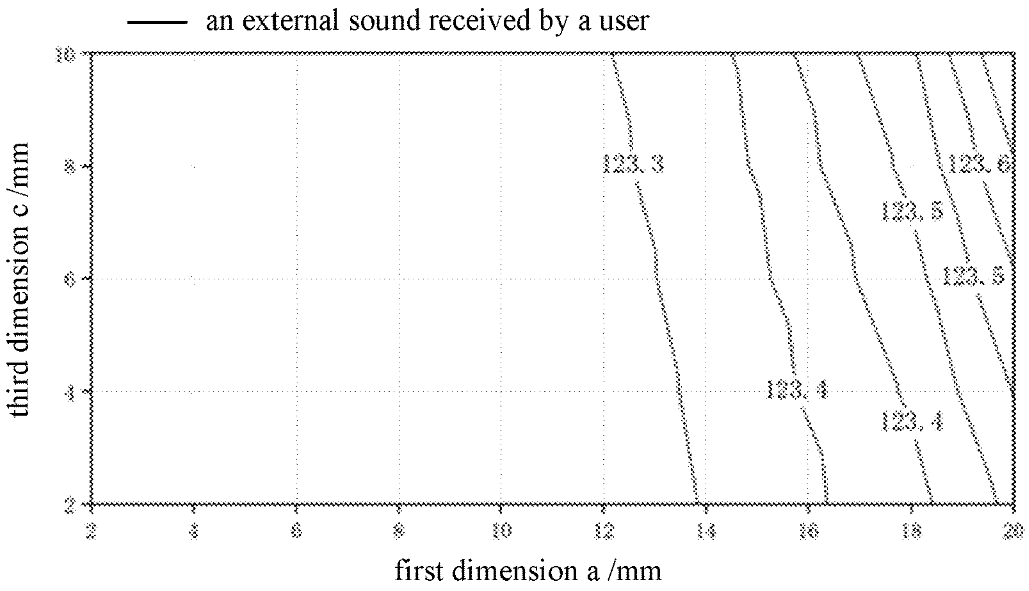
FIG. 7 is a schematic diagram illustrating a relationship between a dimension of the at least one blocking member of the earphone illustrated in FIG. 2 and a received external sound.
Figure 8:
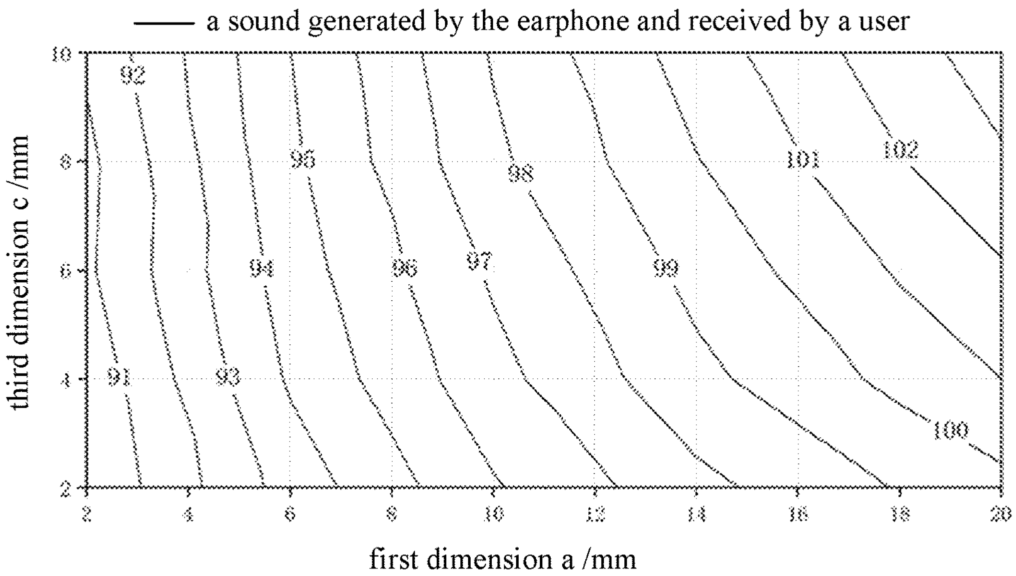
FIG. 8 is a schematic diagram illustrating a relationship between a received sound generated by the earphone illustrated in FIG. 2 and a first dimension as well as a third dimension of the at least one blocking member.

According to FIG. 6 to FIG. 8, FIG. 6 is a schematic diagram illustrating a comparison of sound pressures in an ear canal when the earphone illustrated in FIG. 2 is with and without a blocking member, FIG. 7 is a schematic diagram illustrating a relationship between a dimension of at least one blocking member of the earphone illustrated in FIG. 2 and a received external sound, and FIG. 8 is a schematic diagram illustrating a relationship between a sound received by the earphone illustrated in FIG. 2 and a first dimension as well as a third dimension of the at least one blocking member.

As shown in FIG. 6, the sound pressure in the ear canal is relatively weak when the earphone 100 is without the blocking member 50, and the sound pressure in the ear canal 300 is relatively strong when the earphone is with the blocking member 50. Accordingly, the blocking member 50 has a significant effect on improving the volume of the sound generated by the earphone 100 and heard by the user.

As shown in FIG. 7 and FIG. 8, as the first dimension a of the first blocking member 52 increases, the volume of the sound generated by the earphone 100 and heard by the user gradually increases. When the first dimension a is relatively small, an increase in the third dimension c of the second blocking member 54 has little effect on the volume of the sound generated by the earphone 100 and heard by the user. The third dimension c is a distance between an end of the second blocking member 54 and the second side surface 123, wherein the end of the second blocking member 54 is connected to the second side surface 123 and away from the loudspeaker component 10; or the third dimension c is a distance between an end of the second blocking member 54 and the third side surface 124, wherein the end of the second blocking member 54 is connected to the third side surface 124 and away from the loudspeaker component 10. A n increase in the first dimension a has little effect on the volume of t the sound generated by the earphone 100 and heard by the user when the first dimension a is relatively large. In other words, in the present disclosure, the first blocking member 52 plays a dominant role in blocking external noise, and the larger the blocking area of the first blocking member 52 on the ear canal is, the better the blocking effect is. However, when the blocking area of the first blocking member 52 on the ear canal 300 reaches a certain value, the gain effect of increasing the first dimension a diminishes.

In this embodiment, the first blocking member 52 and the second blocking member 54 are both flat plates, the first blocking member 52 is relatively perpendicular to the first side surface 122, and the second blocking member 54 is perpendicular to the second side surface 123 and the third side surface 124, such that a relatively strong sound insulation effect can be achieved with a relatively small material volume.

In other embodiments, the first blocking member 52 may be inclined relative to the first side surface 122, and the second blocking member 54 may be inclined relative to the second side surface 123 and/or the third side surface 124, e.g. an angle between the first blocking member 52 and the sound-out surface 121 or the top surface 125, and an angle between the first blocking member 52 and the sound-out surface 121 or the top surface 125 may be ±60°, ±45°, or ±30°, which may prevent the at least one blocking member 50 from abutting against the auricle 200 and causing discomfort when the earphone 100 is worn, and the present disclosure does not specifically limit a range of the angle.

In the present disclosure, the at least one blocking member 50 may be fixedly connected to the housing 12 or movably connected to the housing 12. When the at least one blocking member 50 is movably connected to the housing 12, the at least one blocking member 50 may telescope, rotate, or fold with respect to the housing 12 to change an area of a portion of the at least one blocking member 50 that is exposed to an external environment, thereby adapting to different usage scenarios. For example, when the external noise is high, the area of the portion of the at least one blocking member 50 that is exposed to the external environment may be increased to increase a volume of a sound heard by the user; when the external noise is low or when the external sound is desired to be heard more clearly, the area of the portion of the at least one blocking member 50 that is exposed to the external environment may be decreased.

In some embodiments, the earphone 100 further includes a driving member 14, a sensor, and a controller. The driving member 14 and the sensor may be electrically connected to the controller. The sensor may be an acoustic sensor configured to detect ambient noise and transmit an electrical signal to the controller. The controller is a PCB or a circuit board containing a control circuit, and is configured to adjust an extension length of the first blocking member 52 or the second blocking member 54 with respect to the outer housing 110 based on a magnitude of the ambient noise. The driving member 14 is connected to the first blocking member 52 or the second blocking member 54, and is configured to drive the first blocking member 52 or the second blocking member 54 to telescope, rotate, or fold to change the extension length. When the sensor senses that the ambient noise is relatively large, it may control the driving member 14 to drive the first blocking member 52 or the second blocking member 54 to extend a relatively great length, and when the sensor senses that the ambient noise is relatively small, it may control the driving member 14 to drive the first blocking member 52 or the second blocking member 54 to extend a relatively small length. In the present application, an example is taken in which the driving member 14 drives the first blocking member 52 to extend out of or retract into the housing 12.

In other embodiments, the earphone 100 may not include the sensor or the controller, and the user may manually adjust the at least one blocking member 50 based on signals he or she senses so that the at least one blocking member 50 is adjusted to extend out of the housing 12 to a suitable length.

Figure 9:
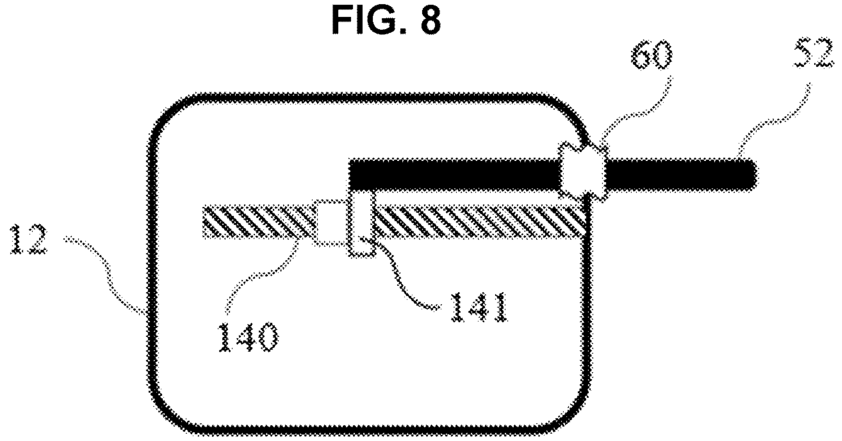
FIG. 9 is a schematic diagram illustrating a first embodiment in which a housing of a loudspeaker component and at least one blocking member are connected through a movable connection.

According to FIG. 9, FIG. 9 is a schematic diagram illustrating a first embodiment in which a housing of a loudspeaker component and at least one blocking member are movably connected.

In the embodiments illustrated in FIG. 9, the driving member 14 includes a screw 140 and a nut 141, with the nut 141 threaded onto the screw 140, the screw 140 has threads, and a pattern on the inside of the nut 141 matches the threads. When the screw 140 rotates, the nut 141 may move in an axial direction of the screw 140. The first blocking member 52 is connected to the nut 141.

In this embodiment, at least a portion of the first blocking member 52 is located in the housing 12, and the screw 140 and the nut 141 are both disposed in the housing 12, as shown in FIG. 9. The nut 141 is connected to an end of the first blocking member 52, and the screw 140 is parallel to the first blocking member 52. When the nut 141 moves on the screw 140, the nut 141 may drive the first blocking member 52 to extend out of or retract into the housing 12 along a direction parallel to the screw 140, so as to adjust the extension length of the first blocking member 52 with respect to the housing 12, thereby changing a blocking area of the first blocking member 52 on the ear canal 300 according to a usage environment.

In other embodiments, the screw 140 may be inclined with respect to the first blocking member 52, and an angle formed between the screw 140 and the first blocking member 52 may be 15°, 30°, or 45°, which is not specifically limited by the present disclosure.

Figure 10:
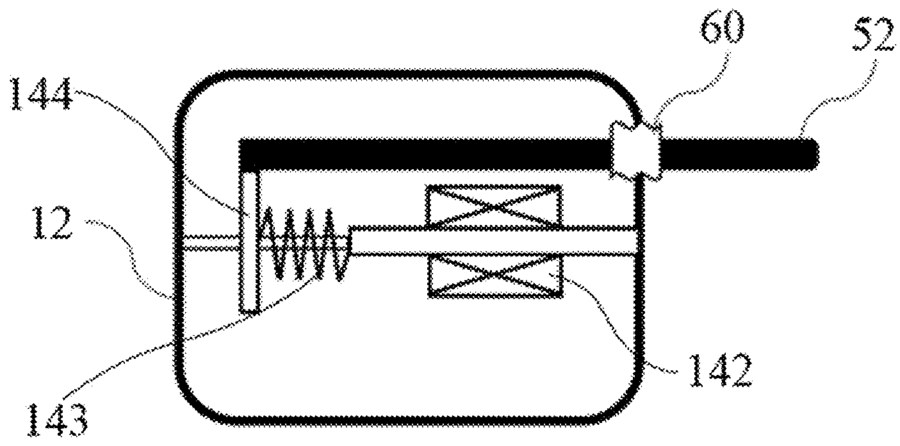
FIG. 10 is a schematic diagram illustrating a second embodiment in which a housing of a loudspeaker component and at least one blocking member are connected through a movable connection.

According to FIG. 10, FIG. 10 is a schematic diagram illustrating a second embodiment in which a housing of a loudspeaker component and at least one blocking member are movably connected.

In the embodiments of FIG. 10, the driving member 14 includes a relay 142, an elastic member 143, and a ferromagnetic member 144. The relay 142, the elastic member 143, and the ferromagnetic member 144 are provided in a line, the elastic member 143 is provided between the relay 142 and the ferromagnetic member 144, and the elastic member 143 is connected to the ferromagnetic member 144. After the relay 142 is energized, the relay 142, due to an electromagnetic effect, may change its magnetism to attract or repel the ferromagnetic member 144, whereby the ferromagnetic member 144 moves under a force of attraction or repulsion of the relay 142. The first blocking member 52 is connected to the ferromagnetic member 144, and a movement of the ferromagnetic member 144 may drive the first blocking member 52 to move, thereby changing an area of a portion of the first blocking member 52 that is exposed to the external environment.

In this embodiment, as shown in FIG. 10, at least a portion of the first blocking member 52 is located in the housing 12, the relay 142, the elastic member 143, and the ferromagnetic member 144 are also disposed in the housing 12, one end of the elastic member 143 is connected to the ferromagnetic member 144, the other end of the elastic member 143 is fixed to the housing 12, one end of the first blocking member 52 is connected to the ferromagnetic member 144, and the ferromagnetic member 144 drives the first blocking member 52 to extend out of or retract into the housing 12 in the same direction under an action of the relay 142. In such cases, an extension length of the first blocking member 52 with respect to the housing 12 may be adjusted, thereby changing the area of the portion of the first blocking member 52 that is exposed to the external environment according to a usage environment.

In other embodiments, the driving member 14 is configured to drive the first blocking member 52 to rotate with respect to the housing 12, so as to change the extension length of the first blocking member 52 relative to the housing 12 and toward the auricle 200.

Figure 11:
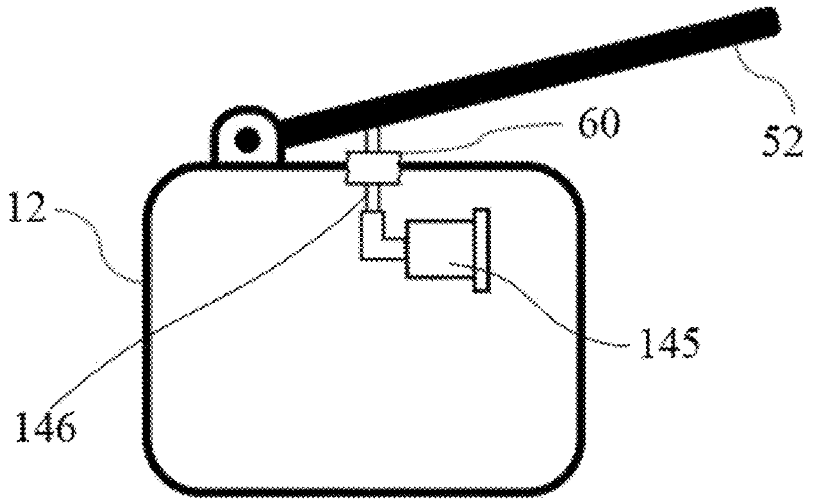
FIG. 11 is a schematic diagram illustrating a third embodiment in which a housing of a loudspeaker component and at least one blocking member are connected through a movable connection.

According to FIG. 11, FIG. 11 is a schematic diagram illustrating a third embodiment in which a housing of a loudspeaker component and at least one blocking member are movably connected.

In the embodiments of FIG. 11, the driving member 14 may include a motor 145 and a telescopic rod 146, the first blocking member 52 is connected to the telescopic rod 146, and one end of the telescopic rod 146 is connected to the motor 145 through a drive connection. The motor 145 may drive the telescopic rod 146 to telescope to drive the first blocking member 52 to rotate.

In this embodiment, as shown in FIG. 11, the first blocking member 52 is entirely located outside the housing 12, one end of the first blocking member 52 is connected to the housing 12 through a hinge connection, one of the telescopic rod 146 is connected to the motor 145, and the other end of the telescopic rod 146 is connected to a side of the first blocking member 52 through a hinge connection. The telescopic rod 146 telescopes to change its length under a drive action of the motor 145, so as to drive the first blocking member 52 to rotate around a hinge point, thereby changing an extension length of the first blocking member 52 relative to the housing 12 and toward the auricle 200.

In some other embodiments, the driving member 14 is configured to drive the first blocking member 52 to fold or extend, so as to change an extension length of the first blocking member 52 relative to the housing 12 and toward the auricle 200.

Figure 12:
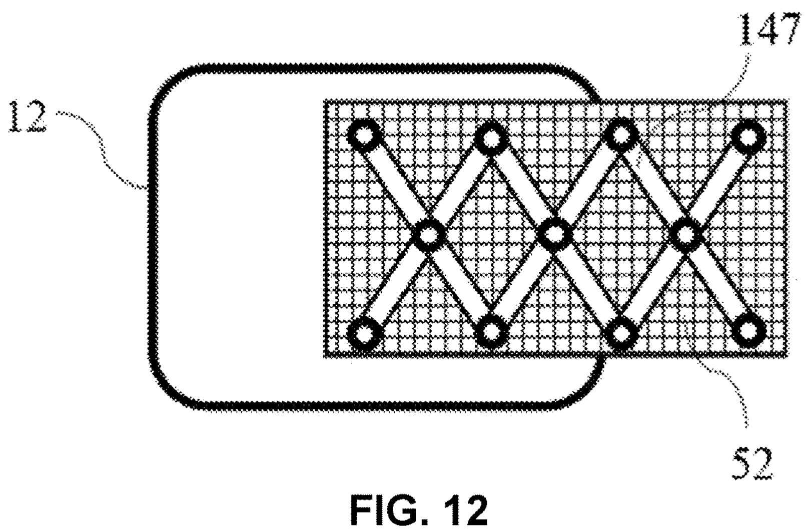
FIG. 12 is a schematic diagram illustrating a fourth embodiment in which a housing of a loudspeaker component and at least one blocking member are connected through a movable connection.

According to FIG. 12, FIG. 12 is a schematic diagram illustrating a fourth embodiment in which a housing of a loudspeaker component and at least one blocking member are movably connected.

In the embodiments of FIG. 12, the driving member 14 includes a telescoping component 147, the telescoping component 147 may be folded or unfolded to change its area, and the first blocking member 52 is provided on one side of the telescoping component 147.

As shown in FIG. 12, a portion of the first blocking member 52 is located in the housing 12, and the telescopic component 147 includes mesh-shaped telescopic rods and covers one side of the first blocking member 52. The telescopic component 147 be folded or unfolded by changing a distance between the telescopic rods, so as to make an area of the first blocking member 52 change with the folding or unfolding of the telescopic component 147, thereby adjusting an extension length of the first blocking member 52 relative to the housing 12, and thus changing an area of a portion of the first blocking member 52 that is exposed to the external environment according to a usage environment.

Specifically, the first blocking member 52 may include a porous film or other material that is easy to fold but not easy to deform. In some embodiments, the earphone 100 also includes a waterproof ring 60. The waterproof ring 60 is provided on the loudspeaker component 10. The waterproof ring 60 may prevent sweat or other liquids, or dust and other impurities from entering the housing 12, henceforth effectively extending the service life of the earphone 100.

Specifically, in the present embodiment, as shown in FIG. 9 and FIG. 10, the waterproof ring 60 is provided on the loudspeaker component 10 and sleeved on the first blocking member 52. When the first blocking member 52 telescopes and moves relative to the loudspeaker component 10, the first blocking member 52 slidably cooperates with the waterproof ring 60, thereby allowing the first blocking member 52 to telescope and move with respect to the loudspeaker component 10, and at the same time preventing sweat or other liquids, or impurities such as dust from entering the housing 12.

In this embodiment, as shown in FIG. 11, the waterproof ring 60 is provided on the loudspeaker component 10 and sleeved on the telescopic rod 146. When the telescopic rod 146 telescopes and moves with respect to the loudspeaker component 10, the telescopic rod 146 slidably cooperates with the waterproof ring 60, thereby allowing the telescopic rod 146 to telescope and move with respect to the loudspeaker component 10, and at the same time preventing sweat or other liquids, or impurities such as dust from entering the housing 12.

According to FIG. 13 to FIG. 16, in some embodiments of the present disclosure, the earphone 100 may further include an outer housing 110 configured to accommodate the loudspeaker component 10. The earphone 100 may include a flexible member 90 made of a flexible material such as rubber, silicone, or the like. The flexible member 90 is disposed between the outer housing 110 and the housing 12 to support between the outer housing 110 and the housing 12, so as to provide a buffer for a relative vibration between the outer housing 110 and the housing 12, thereby reducing or avoiding the transmission of vibrations of the loudspeaker component 10 to the outer housing 110, thereby reducing or avoiding the outer housing 110 from driving surrounding air to vibrate and producing sound leakage. Moreover, the sound leakage generated by the vibration of the surrounding air driven by the vibration of the loudspeaker component 10 is blocked by the outer housing 110, thereby further minimizing the sound leakage generated by the earphone 100. Moreover, the sound leakage generated by the vibration of the surrounding air driven by the vibration of the loudspeaker component 10 may be reflected by the outer housing 110 and enter the user's ear canal, thereby increasing a volume of sound heard by the user.

The flexible member 90 accommodates the housing 12; or the flexible member 90 includes a plurality of flexible blocks 92, the plurality of flexible blocks 92 being spaced between the outer housing 110 and the housing 12. The flexible member 90 may prevent the vibration of the loudspeaker component 10 from being transmitted to the outer housing 110, so that the outer housing 110 may not drive the surrounding air to vibrate and generate the sound leakage.

In some embodiments of the present disclosure, the flexible member 90 may include a sound-absorbing material such that the flexible member 90 may absorb the sound leakage generated by the vibration of the loudspeaker component 10, which further reduces the sound leakage generated by the earphone 100. In some embodiments, the earphone 100 may further include a filling layer, which fills a gap between the outer housing 110 and the housing 12. The filling layer may include a sound-absorbing material such that the filling layer may absorb the sound leakage generated by the vibration of the loudspeaker component 10, which in turn further reduces the sound leakage generated by the earphone 100.

Figure 13:
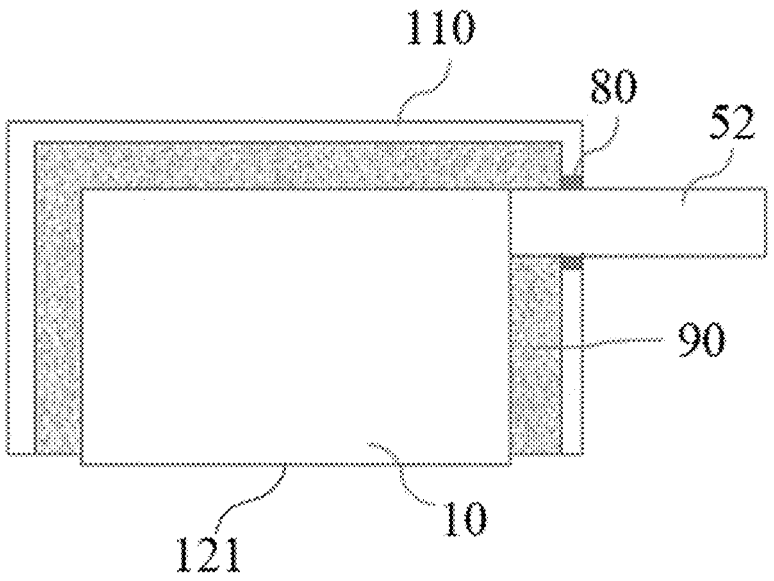
FIG. 13 is a schematic diagram illustrating a first embodiment in which the loudspeaker component and at least one blocking member of the earphone illustrated in FIG. 3 are connected.

In the present disclosure, the sound-absorbing material may include a sound-absorbing sponge or sound-absorbing particles. As shown in FIG. 13, the first blocking member 52 is connected to the loudspeaker component 10, and the sound-out surface 121 is located outside the outer housing 110, so as to prevent the outer housing 110 from absorbing the vibration of the loudspeaker component 10 and enhancing the vibration transmitted from the loudspeaker component 10 to the user. The flexible member 90 is provided between the outer housing 110 and the housing 12 and accommodates the loudspeaker component 10, the flexible member 90 is provided with a through-hole for the first blocking member 52 to extend out of the outer housing 110, and the flexible member 90 may include a flexible material or a sound-absorbing material.

Figure 14:
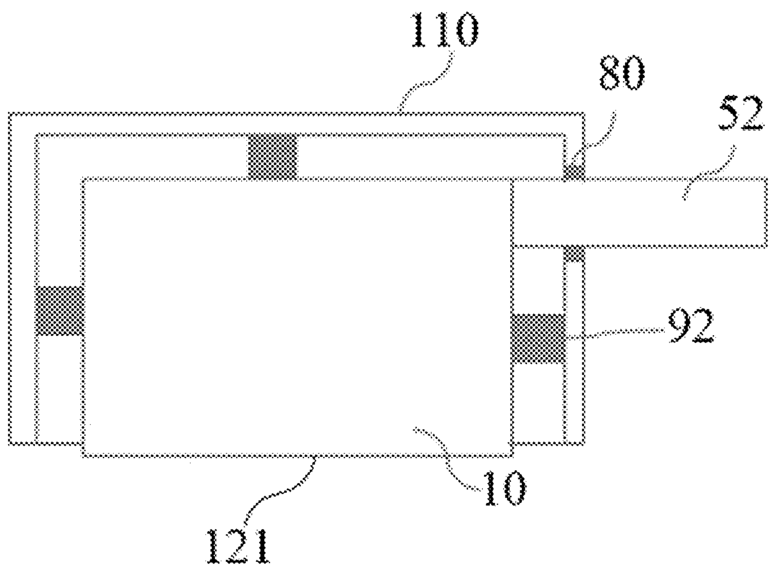
FIG. 14 is a schematic diagram illustrating a second embodiment in which the loudspeaker component and at least one blocking member of the earphone illustrated in FIG. 3 are connected.

As shown in FIG. 14, the first blocking member 52 is connected to the loudspeaker component 10, the sound-out surface 121 is located outside the outer housing 110, and the flexible blocks 92 are connected to the top surface 125 and some side surfaces of the loudspeaker component 10 at intervals and are connected to the outer housing 110 and the housing 12. The flexible blocks 92 may include flexible materials.

In some embodiments, the gap between the outer housing 110 and the housing 12 may also be filled with a sound-absorbing material. Support between the outer housing 110 and the housing 12 is achieved through the flexible blocks 92, and the flexible blocks 92 provide a buffer for a relative vibration between the outer housing 110 and the housing 12. The outer housing 110 blocks sound leakage generated by the vibration of the speaker. The sound leakage generated by the vibration of the loudspeaker component 10 may be further absorbed by the sound-absorbing material.

In the present disclosure, the at least one blocking member 50 may be connected to the outer housing 110; or the at least one blocking member 50 may be connected to the housing 12 and penetrate the outer housing 110.

In some embodiments, the first blocking member 52 may be connected to the housing 12 or the outer housing 110, and is capable of moving relative to the housing 12 or the outer housing 110, so as to change the area of the portion of the first blocking member 52 that is exposed to the external environment. The waterproof ring 60 is correspondingly provided on the housing 12 or the outer housing 110 and slidably cooperates with the first blocking member 52, so as to allow the first blocking member 52 to move relative to the housing 12 or the outer housing 110 and protect sweat or other liquids, or impurities such as dust from entering the housing 12 or the outer housing 110.

According to FIG. 13 and FIG. 14, FIG. 13 is a schematic diagram illustrating a first embodiment in which a loudspeaker component and at least one blocking member of the earphone illustrated in FIG. 3 are connected, and FIG. 14 is a schematic diagram illustrating a second embodiment in which a loudspeaker component and at least one blocking member of the earphone illustrated in FIG. 3 are connected.

In the present embodiment, as shown in FIG. 13 and FIG. 14, the first blocking member 52 is connected to the loudspeaker component 10, and a portion of the first blocking member 52 is located outside the outer housing 110 and extends to the outside. The first blocking member 52 is disposed on the loudspeaker component 10 and may vibrate with the loudspeaker component 10 to transmit audio to the ear canal 300 such that the loudspeaker component 10 may drive the first blocking member 52 to transmit sound.

In some embodiments, the sound-out surface 121 may extend out of the outer housing 110, so as to facilitate direct contact between the sound-out surface 121 of the loudspeaker component 10 and the user's skin. The vibration of the loudspeaker component 10 may be directly transmitted to the bones of the user's head through the sound-out surface 121, so as to prevent the outer housing 110 from blocking sound-out surface 121 from directly contacting the user's skin when the outer housing 110 vibrates relative to the loudspeaker component 10.

Further, as shown in FIG. 13 and FIG. 14, the earphone 100 may include a flexible ring 80. The flexible ring 80 may include a flexible material and be provided at a connection between the first blocking member 52 and the outer housing 110. Specifically, the outer housing 110 is provided with a through-hole, and the first blocking member 52 extends out of the outer housing 110 through the through-hole. The flexible ring 80 is disposed within the through-hole and sleeved on the first blocking member 52. The flexible ring 80 provides a buffer between the first blocking member 52 and the outer housing 110, which reduces the vibration transmission between the first blocking member 52 and the outer housing 110 and prevents the vibration transmitted by the loudspeaker component 10 from being dispersed to the outer housing 110, thereby ensuring that more vibrations of the first blocking member 52 are transmitted to the user. The flexible ring 80 also has a waterproof and dustproof effect, thereby preventing liquid or dust from entering the earphone 100.

In some embodiments, the at least one blocking member 50 is fixedly connected to the outer housing 110, and the at least one blocking member 50 is fixed at a position with respect to the outer housing 110 and may not be moved.

Figure 15:
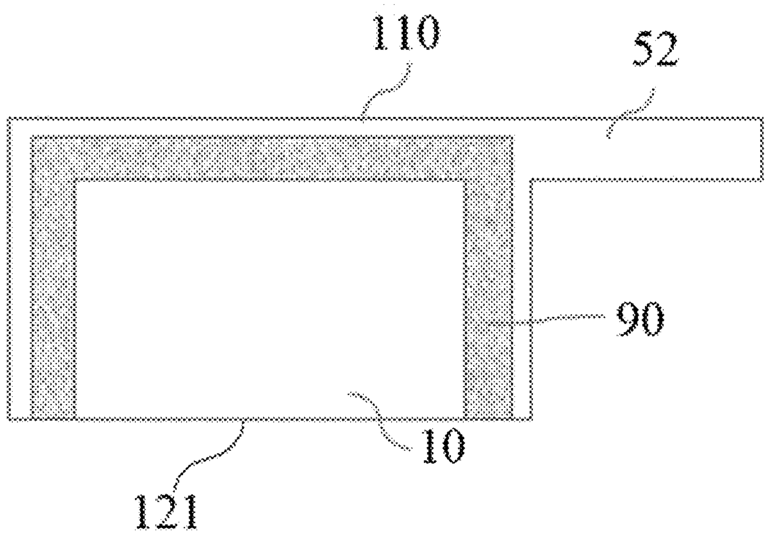
FIG. 15 is a schematic diagram illustrating a first embodiment in which an outer housing and at least one blocking member of the earphone illustrated in FIG. 3 are connected.
Figure 16:
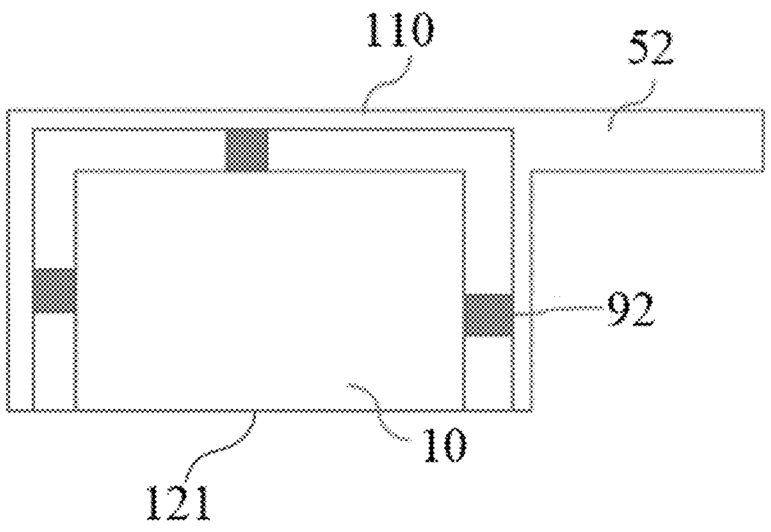
FIG. 16 is a schematic diagram illustrating a second embodiment in which an outer housing and at least one blocking member of the earphone illustrated in FIG. 3 are connected.

According to FIG. 15 and FIG. 16, FIG. 15 is a schematic diagram illustrating a first embodiment in which a housing and at least one blocking member of the earphone illustrated in FIG. 3 are connected, and FIG. 16 is a schematic diagram illustrating a second embodiment in which a housing and at least one blocking member of the earphone illustrated in FIG. 3 are connected.

As shown in FIG. 15, the first blocking member 52 is directly connected to the outer housing 110, and the flexible member 90 is provided between the outer housing 110 and the loudspeaker component 10 and accommodates the loudspeaker component 10. The flexible member 90 may include a flexible material or a sound-absorbing material.

As shown in FIG. 16, the first blocking member 52 is connected directly to the outer housing 110, and the flexible block 92 is connected to each surface of the speaker 70 that is wrapped by the outer housing 110. The flexible block 92 may include a flexible material.

When the loudspeaker component 10 vibrates to emit a low-frequency sound, the flexible material may vibrate along with the loudspeaker component 10, and when the loudspeaker component 10 emits a high-frequency sound, the flexible material may vibrate relative to the loudspeaker component 10. Therefore, at low frequencies, the flexible member 90 or the flexible blocks 92 may drive the outer housing 110 to vibrate with the loudspeaker component 10, and at high frequencies, the flexible member 90 or the flexible blocks 92 may not drive the outer housing 110 to vibrate with the loudspeaker component 10. In such cases, at low frequencies, the first blocking member 52 may vibrate at the same frequency as the loudspeaker component 10 to produce a sound, thereby complementing the low-frequency response.

By providing the first blocking member on one side of the loudspeaker component, wherein when the user wears the earphone, a portion of the first blocking member extends in an extension direction from the loudspeaker component to the ear canal of the user, the at least one blocking member may cover a portion of the ear canal. The at least one blocking member may vibrate along with a body of the earphone, causing the surrounding air to vibrate and transmit sound to the eardrum, which is equivalent to increasing the air conduction and increasing a volume of sound heard by the ear. Moreover, more sound waves generated by the loudspeaker component may be reflected to the ear canal by the at least one blocking member, thereby increasing the sound generated by the earphone and heard by the user. The at least one blocking member may block external noise from being transmitted to the ear canal, which allows the user to hear the content clearly at a smaller volume. Using the smaller volume may further reduce the sound leakage, thereby improving the user's listening experience.

The foregoing is only an example of the embodiments of the present disclosure, and is not intended to limit the scope of the patent of the present disclosure, and any equivalent structure or equivalent process transformations utilizing the contents of the present disclosure and the accompanying drawings, or directly or indirectly applied in other related technical fields, are included in the scope of patent protection of the present disclosure.

What is claimed is:

1. An earphone, comprising:

a loudspeaker component, wherein the loudspeaker component is a bone-conduction loudspeaker component, when the earphone is in a wearing state, the loudspeaker component is located at a position including one of: on a front side of an auricle of a user, on the auricle, or on a rear side of the auricle; and at least one blocking member, the at least one blocking member including a first blocking member coupled to the loudspeaker component;

wherein in the wearing state, at least a portion of the first blocking member extends in an extension direction from the loudspeaker component to an ear canal of the user, and the at least one blocking member is driven to vibrate when the loudspeaker component vibrates, and the vibration of the at least one blocking member drives a vibration of surrounding air to generate an air-conduction sound transmitted to the ear canal of the user.

2. The earphone of claim 1, wherein a first dimension of the first blocking member in a first direction is less than or equal to twice a second dimension of the loudspeaker component in the first direction, the first direction being the extension direction from the loudspeaker component to the ear canal, and the first dimension is a dimension of a portion of the first blocking member exposing from the loudspeaker component.

3. The earphone of claim 2, wherein the loudspeaker component includes a sound-out surface, a first side surface, a second side surface, and a third side surface, the first, second, and third side surfaces are adjacent to the sound-out surface, the first side surface is adjacent to the second side surface and the third side surface, and the second side surface faces away from the third side surface;

the sound-out surface faces a head of the user in the wearing state, and the first blocking member is provided on the first side surface; and the at least one blocking member further includes a second blocking member, the second blocking member being provided on the second side surface and/or the third side surface.

4. The earphone of claim 3, wherein a third dimension of the second blocking member in a second direction is less than or equal to the first dimension, the second direction being perpendicular to the first direction.

5. The earphone of claim 1, wherein in the wearing state, at least a portion of a projection of the first blocking member is in a concha cavity of the user, and a projection direction of the projection of the first blocking member is the same as a vibration direction of the loudspeaker component.

6. The earphone of claim 5, wherein in the wearing state, at least a portion of the projection of the first blocking member covers the concha cavity of the user.

7. The earphone of claim 1, wherein the loudspeaker component includes a housing and a speaker, the housing is configured to accommodate the speaker; and the first blocking member is fixed to the housing or connected to the housing through a movable connection, or the first blocking member is provided on the speaker.

8. The earphone of claim 7, further comprising a driving member, a sensor, and a controller, wherein the driving member is connected to the first blocking member, the driving member and the sensor are electrically connected to the controller, the sensor is configured to detect ambient noise, and the controller is configured to adjust an extension length of the first blocking member relative to the housing based on a magnitude of the ambient noise.

9. The earphone of claim 8, wherein the driving member is configured to drive the first blocking member to retract, rotate, or fold.

10. The earphone of claim 8, wherein the first blocking member is slidably provided on the housing, the driving member includes a screw and a nut, and the first blocking member is connected to the nut; or the driving member includes a relay, an elastic member, and a ferromagnetic member, the first blocking member being connected to the ferromagnetic member, and the elastic member being provided between the relay and the ferromagnetic member.

11. The earphone of claim 10, further comprising a waterproof ring, wherein the waterproof ring is provided on the housing, and the first blocking member or the telescopic rod slidably cooperates with the waterproof ring.

12. The earphone of claim 8, wherein one end of the first blocking member is connected to the housing through a hinge connection, and the driving member includes a motor and a telescopic rod, one end of the telescopic rod being connected to the motor through a drive connection, and the other end of the telescopic rod being connected to the first blocking member through a hinge connection, and the motor is configured to drive the first blocking member to rotate by driving the telescopic rod to telescope.

13. The earphone of claim 8, wherein the driving member includes a telescoping component, the first blocking member is provided on one side of the telescoping component and folds or unfolds as the telescoping component telescopes.

14. The earphone of claim 1, further comprising an outer housing, wherein the loudspeaker component includes a housing and a speaker the housing is configured to accommodate the speaker;

the outer housing accommodates the loudspeaker component, and the first blocking member is provided on the outer housing or the housing; and a flexible member is connected between the outer housing and the housing.

15. The earphone of claim 14, wherein the flexible member accommodates the housing; or the flexible member includes a plurality of flexible blocks, the plurality of flexible blocks being spaced between the housing and the outer housing.

16. The earphone of claim 14, wherein the first blocking member is provided on the housing and partially extends out of the housing, and a flexible ring is provided at a junction between the first blocking member and the outer housing.

17. The earphone of claim 14, wherein the flexible member includes a sound-absorbing sponge or sound-absorbing particles.

18. The earphone of claim 1, wherein a material of the at least one blocking member has a loose porous structure or a loose plush structure.

19. The earphone of claim 1, wherein a thickness of the first blocking member is gradually reduced in a direction from the loudspeaker component to a direction away from the loudspeaker component.

20. The earphone of claim 1, wherein sound waves generated by the loudspeaker component are reflected to the ear canal by the at least one blocking member.

* * * * *